United States Patent
Rich et al.

(10) Patent No.: US 9,692,472 B2
(45) Date of Patent: Jun. 27, 2017

(54) RADIO RECEIVER WITH LOCAL OSCILLATOR MODULATION

(71) Applicant: GOOGLE INC., Mountain View, CA (US)

(72) Inventors: Mark Rich, Menlo Park, CA (US); Paul Kolodzy, Falls Church, VA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 15/016,004

(22) Filed: Feb. 4, 2016

(65) Prior Publication Data
US 2016/0226541 A1    Aug. 4, 2016

Related U.S. Application Data

(60) Provisional application No. 62/112,133, filed on Feb. 4, 2015.

(51) Int. Cl.
*H04B 1/10* (2006.01)
*H04B 1/16* (2006.01)
(Continued)

(52) U.S. Cl.
CPC ............... *H04B 1/16* (2013.01); *H04B 1/109* (2013.01); *H04L 27/22* (2013.01); *H04L 27/26* (2013.01); *H04B 15/00* (2013.01)

(58) Field of Classification Search
CPC .......... H04B 1/16; H04B 1/109; H04B 15/00; H04L 27/26; H04L 27/22
(Continued)

(56) References Cited

U.S. PATENT DOCUMENTS

| | | | |
|---|---|---|---|
| 5,731,781 A | * | 3/1998 | Reed ............ G01S 13/325 342/135 |
| 5,892,477 A | | 4/1999 | Wehling |

(Continued)

FOREIGN PATENT DOCUMENTS

| | | |
|---|---|---|
| EP | 0 899 868 A1 | 3/1999 |
| WO | 93/14578 A1 | 7/1993 |
| WO | 2016/127010 A1 | 8/2016 |

OTHER PUBLICATIONS

Eozenou, "International Search Report and Written Opinion issued in International Application No. PCT/US2016/016667", mailed on May 3, 2016, 12 pages.

*Primary Examiner* — Siu Lee
(74) *Attorney, Agent, or Firm* — Johnson, Marcou & Isaacs, LLC

(57) ABSTRACT

An antenna subsystem receives an analog desired signal, noise, and interference via a communication channel. The desired signal includes modulated encoded digital information. A local oscillator (LO) modulation subsystem generates a modulated LO. The LO modulation subsystem generates a modulated LO to maximize the symbol signal-to-noise ratio of the decoded digital information based on a plurality of: the desired signal, the interference and the noise expected in the communication channel, the characteristics of the converter, and the ability of the DSP to remove the Modulated LO from the converted signal. A mixer mixes the received signal and the modulated LO. A converter converts the mixed signal from analog to digital. A digital signal processor (DSP) removes the modulated LO and desired signal modulation, and decodes the desired signal encoded digital information.

18 Claims, 7 Drawing Sheets

(51) Int. Cl.
*H04L 27/22* (2006.01)
*H04L 27/26* (2006.01)
*H04B 15/00* (2006.01)

(58) Field of Classification Search
USPC ........ 375/316, 340, 342, 346, 259, 260, 285
See application file for complete search history.

(56) References Cited

U.S. PATENT DOCUMENTS

| | | | | |
|---|---|---|---|---|
| 7,177,617 | B2* | 2/2007 | Kerth | H04B 1/28 |
| | | | | 375/346 |
| 7,656,931 | B2* | 2/2010 | Smith | H04B 1/692 |
| | | | | 375/131 |
| 8,121,575 | B2* | 2/2012 | Ruijter | H04B 1/30 |
| | | | | 455/296 |
| 8,849,226 | B2* | 9/2014 | Bruchner | H04B 1/40 |
| | | | | 370/252 |
| 9,209,845 | B2* | 12/2015 | Nentwig | H04B 1/10 |
| 2003/0043933 | A1* | 3/2003 | Kintis | H04B 1/28 |
| | | | | 375/308 |
| 2009/0098848 | A1* | 4/2009 | Ruijter | H04B 1/30 |
| | | | | 455/337 |
| 2011/0255620 | A1 | 10/2011 | Jones, IV et al. | |

* cited by examiner

RADIO RECEIVER WITH LOCAL OSCILLATOR MODULATION

CROSS REFERENCE TO RELATED APPLICATION

This application claims priority to U.S. Provisional Patent Application No. 62/112,133 filed Feb. 4, 2015, and entitled "Radio Receiver with Local Oscillator Modulation," the entire contents of which are hereby fully incorporated herein by reference.

TECHNICAL FIELD

The present disclosure relates to radio frequency (RF) receivers, and more specifically, to modulating a local oscillator of a digital RF receiver.

BACKGROUND

FIG. 1 presents a simplified block diagram of a conventional digital heterodyne radio receiver 100. The wireless communications signal 90 to be received by such a receiver 100 can be characterized as comprising three (3) components: the desired signal 92, interference 94, and noise 96. The desired signal 92 typically includes information that has been encoded, modulated, and up-converted to a carrier signal in the RF band by a transmitter (not shown).

Conventionally, a carrier signal is a waveform, at a much higher frequency than the baseband-modulated encoded information that is mixed with the modulated encoded information to transmit the information through space as an electromagnetic wave, or to allow several carrier signals at different frequencies to share a common physical transmission medium by frequency division multiplexing. Some types of RF communication, for example, spread spectrum and orthogonal frequency division multiplexing (OFDM), may not use a conventional sinusoidal carrier wave.

The interference 94 is typically from one or more man-made RF sources. Broadly stated, narrowband interference is typically from intended transmissions, such as radio, television, and mobile phone systems; while broadband interference typically is unintentional and emanates from sources such as electrical power transmission lines that are not intended to be transmitters.

Noise 96 refers to all other RF components of energy in the signal 90, of which noise of the receiver itself in the RF range (for example, from a noisy power supply coupled to the RF path) may be a principal component.

In such a receiver 100, the signal 90 can be received by an antenna system 110. Typically, the antenna system 110 is configured to be more responsive to a wide band of frequencies around the carrier frequency, for example, the entire commercial Frequency Modulation (FM) broadcast band comprising many separate FM channels, than to frequencies outside the range of the desired signal 92.

A signal conditioning subsystem 120 typically is used to passively limit noise and interference first by applying an RF Filter 122 to reduce received noise 96 and interference 94 outside the frequency band of the desired signal 92. Then, the filtered signal is amplified, for example, by using a low noise amplifier/variable gain amplifier (LNA/VGA) 124.

After passively reducing noise and interference in the signal conditioning subsystem 120, a conventional heterodyne receiver 100 will remove the carrier, effectively bringing the modulated encoded signal from the RF range, in which it is much easier to transmit the signal over distance, down to baseband. In the case of a simple sinusoidal carrier signal, a mixer 140 mixes the output of the signal conditioning subsystem 120 with a local oscillator (LO) 130 matched to the carrier signal to remove the carrier signal.

In a digital receiver, such as conventional heterodyne receiver 100, the output of the mixer 140 remains an analog signal. Converter 150 is used to convert the analog signal from the mixer 140 to a digital signal. The converted signal can then be processed by digital signal processor 160 to decode the information contained therein.

SUMMARY

Embodiments of the technology disclosed herein provide systems, methods, and computer program products for receiving an RF communication. In such systems, an antenna subsystem receives an analog desired signal, noise, and interference via a communication channel. The desired signal includes modulated encoded digital information. A local oscillator (LO) modulation subsystem generates a modulated LO. A mixer mixes the received signal and the modulated LO. A converter converts the mixed signal from analog to digital. A digital signal processor (DSP) removes the modulated LO and desired signal modulation, and decodes the desired signal encoded digital information. More particularly, the LO modulation subsystem generates a modulated LO to maximize the symbol signal-to-noise ratio of the decoded digital information based on a plurality of: the desired signal, the interference and the noise expected in the communication channel, the characteristics of the converter, and the ability of the DSP to remove the Modulated LO from the converted signal.

These and other aspects, objects, features, and advantages of the example embodiments will become apparent to those having ordinary skill in the art upon consideration of the following detailed description of illustrated example embodiments.

DETAILED DESCRIPTION OF THE EXAMPLE EMBODIMENTS

Overview

Today's communication receivers rely upon a high quality local sine wave oscillator to recover modulated signals. The ability to achieve sufficient local oscillator quality affects the cost and performance of the receiver. In addition, the use of a non-uniform ADC in converter 150 can improve the dynamic range of a communication receiver but is characterized by a sampled signal with a disadvantageous time dependent signal-to-noise ratio (SNR).

In certain example embodiments described herein, intentionally modulating the LO can relax the quality constraints on the LO. Modulating the LO as described herein provides a way to improve communications receiver performance compared to conventional receivers—where a typical mechanism for improving performance is to improve the quality (for example, the phase noise characteristics) of the conventional LO. In some embodiments of the present technology, locally determined (at each receiver) modulation of the LO provides diversity in the operation of the receiver systems.

Figure 7:
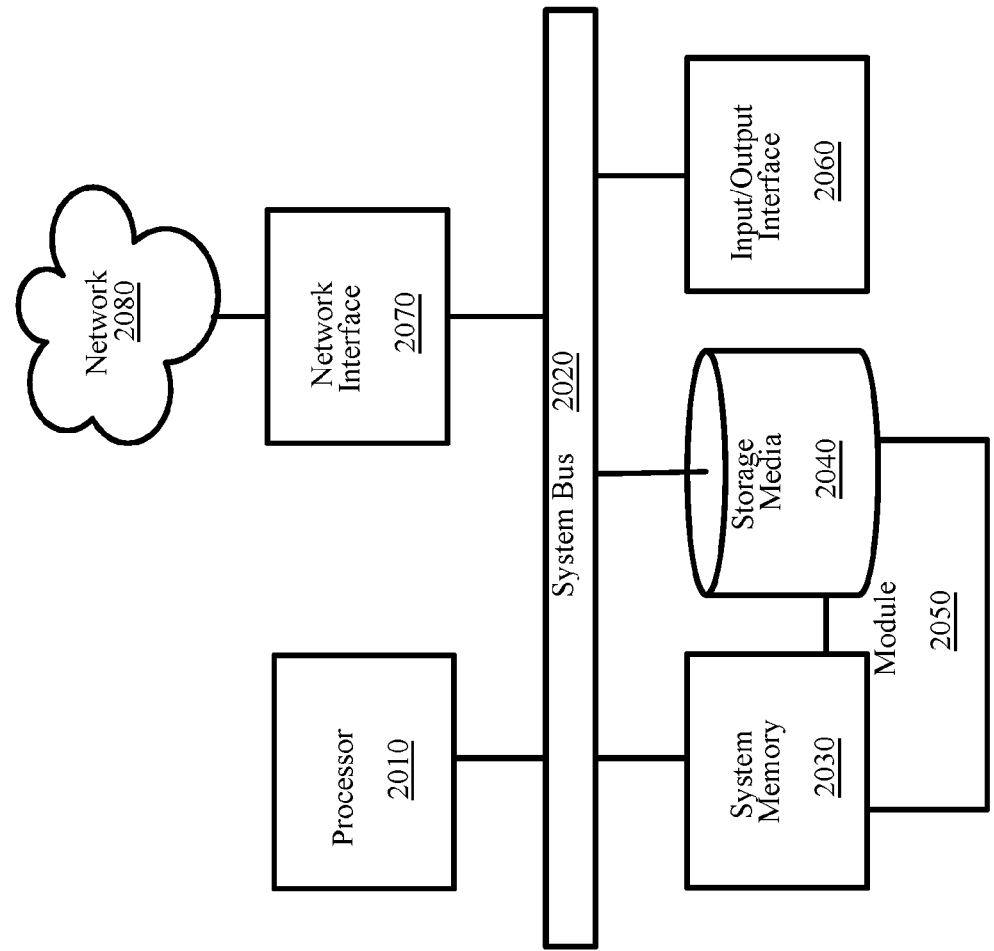
FIG. 7 is a block diagram depicting a computing machine and a module in accordance with certain example embodiments.

In example embodiments, devices and any other computing machines associated with the technology presented herein may be any type of computing machine such as, but not limited to, those discussed in more detail with respect to FIG. 7. Furthermore, any modules associated with any of these computing machines, such as those described herein or any others (scripts, web content, software, firmware, or hardware) associated with the technology presented herein may by any of the modules discussed in more detail with respect to FIG. 7. The computing machines discussed herein may communicate with one another as well as other computing machines or communication systems over one or more networks. The network may include any type of data or communications network, including any of the network technology discussed with respect to FIG. 7. The radio receivers disclosed herein, and methods therefor, can be implemented in part using the architecture of FIG. 7, and with other computing platform technology, such as Application Specific Integrated Circuits (ASICs), along with radio frequency technology.

Turning now to the drawings, in which like numerals indicate like (but not necessarily identical) elements throughout the figures, example embodiments are described in detail.

Example System Architectures

Figure 2:
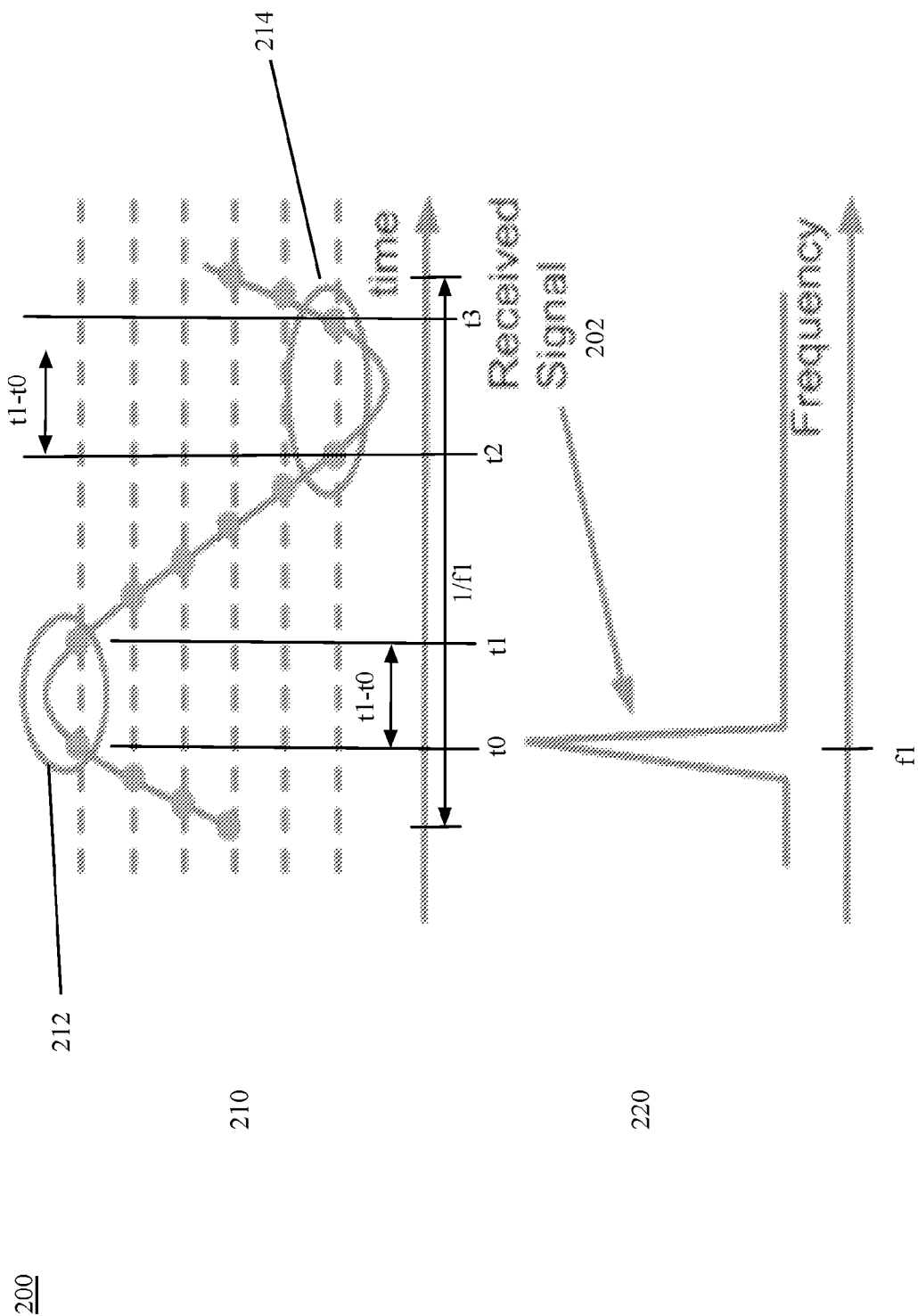
FIG. 2 presents a time domain plot and a frequency domain plot of a simple received signal sampled by a non-uniform Analog-to-Digital Converter (ADC), in accordance with certain example embodiments.

Referring to FIG. 2, an example 200 of non-uniform sampling of a pure tone signal 202 at frequency f1 is illustrated. Frequency domain plot 220 shows signal 202 at frequency f1. In the time domain plot 210, in the region of the maximum amplitude 212, the time between samples is t1–t0. In the region of the minimum amplitude 214, the time between samples is t3–t2. It can be seen that t3–t2 and t1–t0 are not the same, and that each is greater than the average interval between samples. This non-uniformity results in reduced information content in the sampled signal.

Figure 3:
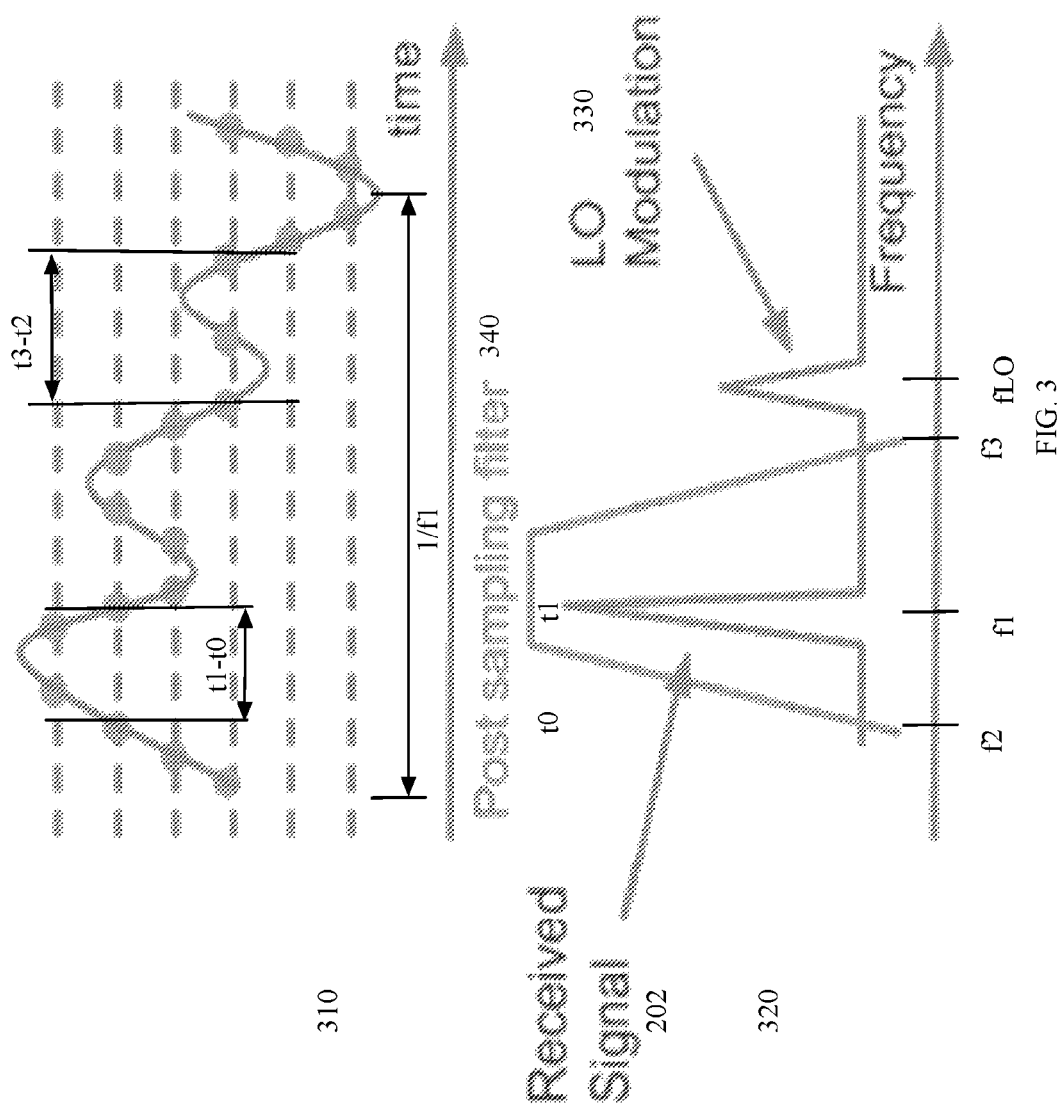
FIG. 3 presents a time domain plot and frequency domain plot of a simple signal with local oscillator modulation, in accordance with certain example embodiments.

Referring to FIG. 3, an example 300 of non-uniform sampling of the same signal 202 at f1 in the presence of LO modulation 330 is illustrated. The time domain plot 310 shows that samples are taken over a shorter period than either t1–t0 or t3–t2 from FIG. 2. As a consequence, more is known about the signal, resulting in a better SNR for the underlying information. The frequency domain plot 320 shows that a post-sampling band can remove the Modulated LO 330 pass filter 340.

Figure 4:
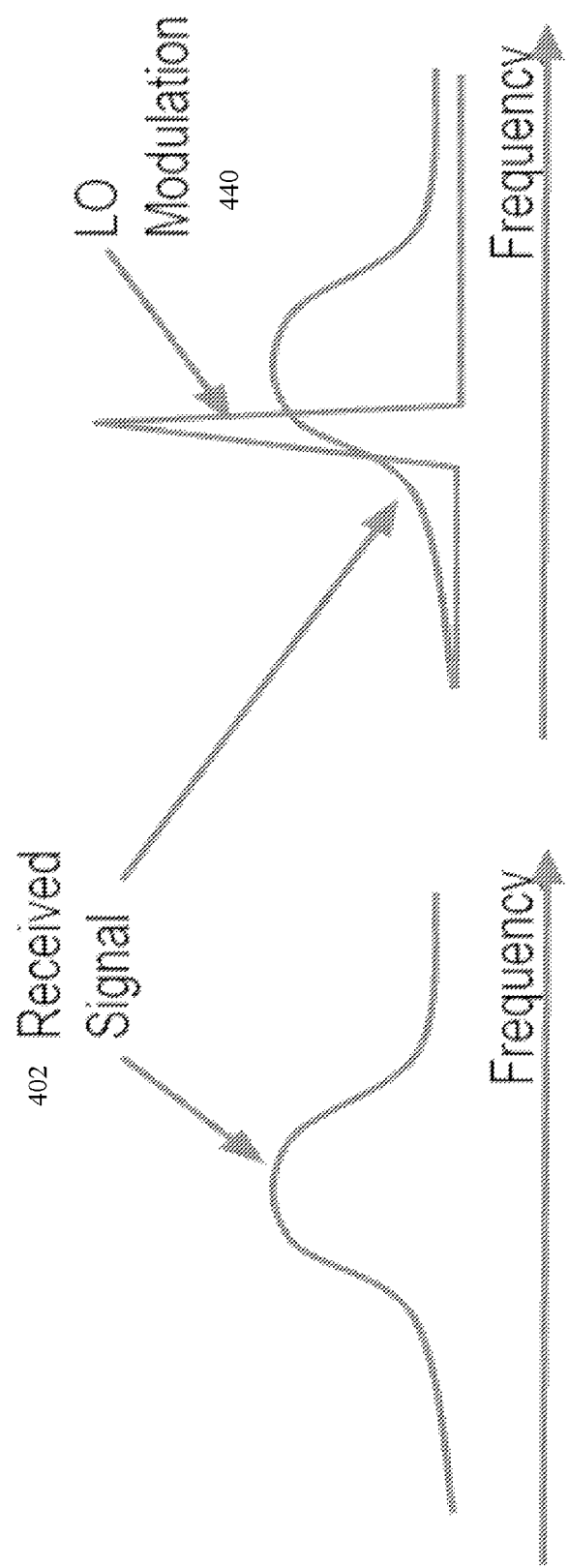
FIG. 4 presents a frequency domain plot of a more complex signal having multiple frequency components, and a frequency domain plot of the more complex signal and a local oscillator modulation, in accordance with certain example embodiments.

In a more general case 400, as illustrated in FIG. 4, the received signal 402 can be modulated and contain encoded information, rather than being a simple tone such as received signal 202 of FIG. 2 and FIG. 3. Placing the modulated LO outside the bandwidth of the received signal 202, as shown in the frequency domain plot 320 of FIG. 3, would undesirably increase the sampling bandwidth of the converter 150. Putting the modulated LO 440 within the received signal 402 bandwidth improves the non-uniform ADC sampling amplitude range, but may make it difficult to remove the modulated LO 440 with a post-sampling filter. However, since the modulated LO 440 is "local," it can be subtracted from the post-sampled signal. Using a pure tone for LO modulation, while useful for the examples above, is undesirable because the LO leakage (another source of noise) may be increased.

In embodiments of the present technology, intentionally modulating the LO can relax the quality constraints on the LO. Modulating the LO as described herein improves communications receiver performance compared to conventional receivers—where a typical mechanism for improving performance is to improve the quality (for example, the phase noise characteristics) of the conventional LO. In some embodiments of the present technology, locally determined (at each receiver) modulation of the LO provides diversity in the operation of the receiver systems. While a non-uniform ADC is used in the example of FIG. 2-FIG. 4 to highlight benefits of the present technology, the present technology offers such benefits even with the use of a conventional ADC in a receiver.

Figure 5:
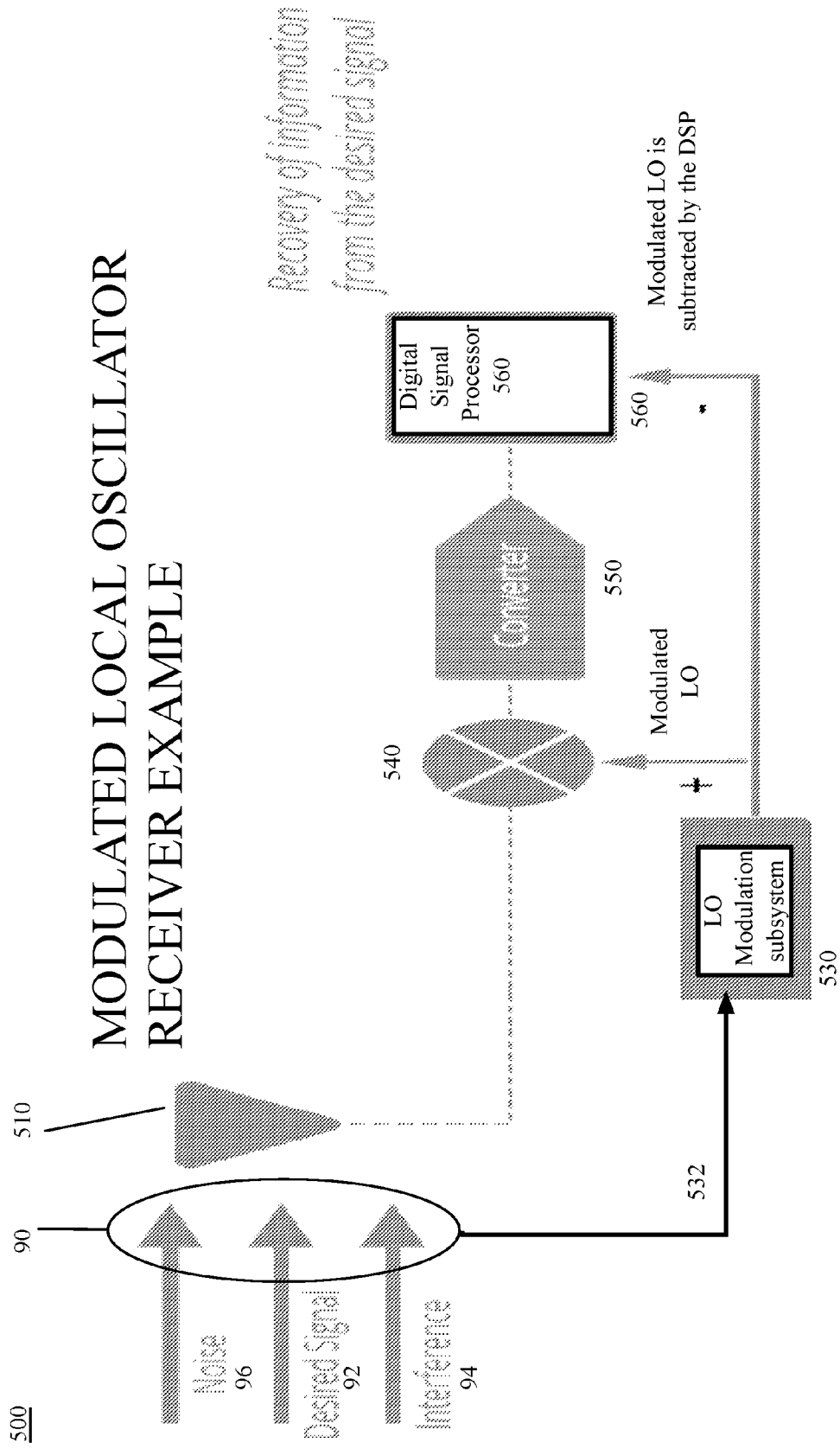
FIG. 5 is a block diagram depicting a receiver in accordance with certain example embodiments.

Referring to FIG. 5, a simplified block diagram for a receiver 500 implementing embodiments of the present technology is shown. As in FIG. 1, the wireless communications signal 90 to be received by such a receiver 500 can be characterized as comprising three (3) components: the desired signal 92, interference 94, and noise 96. The desired signal 92 typically includes information that has been encoded, modulated, and up-converted to a carrier signal in the radio frequency (RF) band by a transmitter (not shown). In such a receiver 500, the signal 90 can be received by an antenna system 510 configured to be more responsive to a wide band of frequencies around the carrier frequency than to frequencies outside the range of the desired signal 92.

Figure 1:
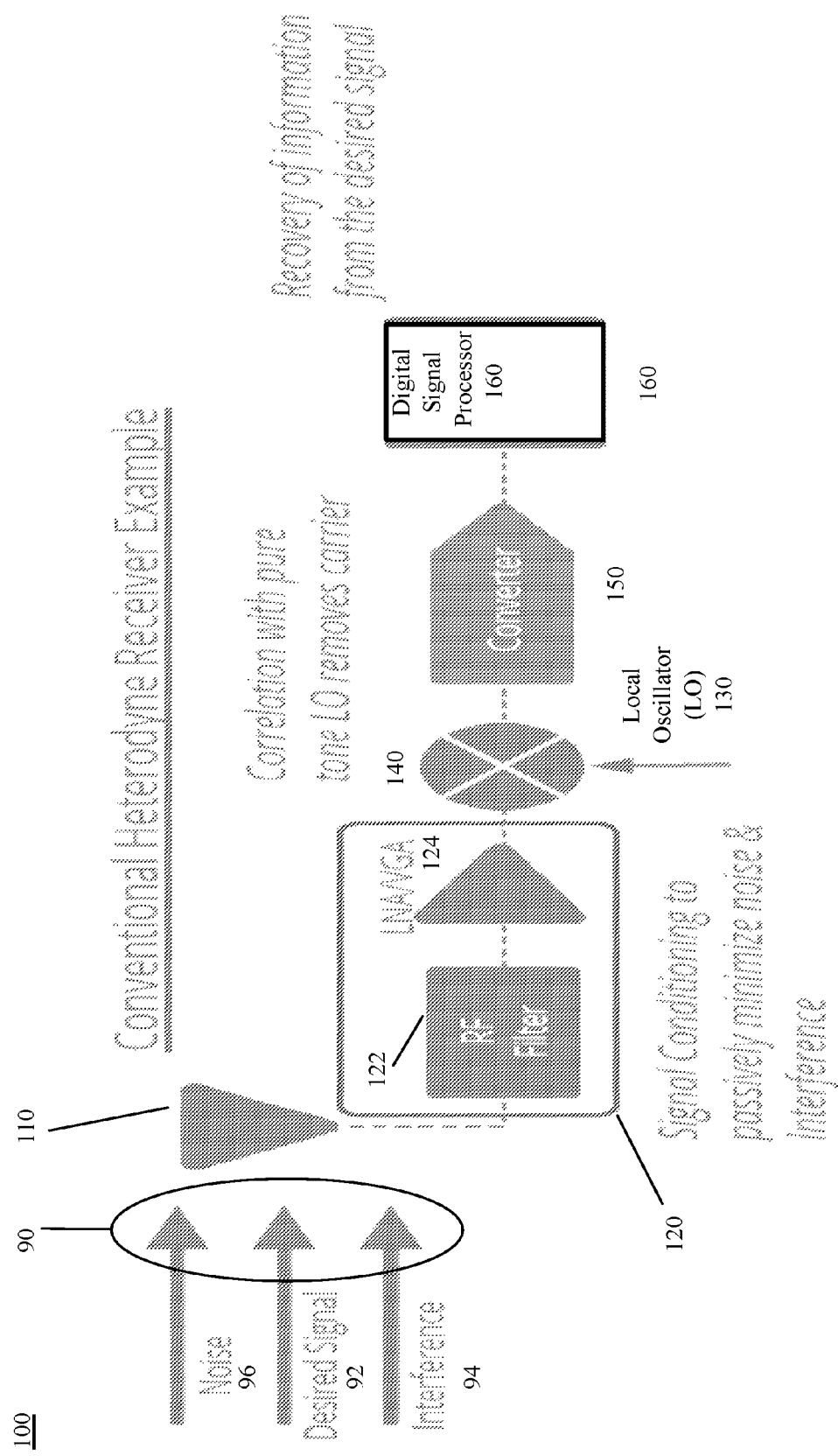
FIG. 1 is a block diagram depicting a conventional heterodyne RF receiver.

In some embodiments of the present technology, the signal conditioning subsystem 120 shown in FIG. 1 can be omitted. As with FIG. 1, a mixer 540 can be used to combine the received signal with an LO—however, in the present technology, the LO is a modulated LO, generated using LO modulation subsystem 530.

Specifically, the type and parameters of the modulation are selected to optimize symbol signal-to-noise ratio. Modulated LO considerations include: the desired signal 92, including selecting bandwidth similar to the desired signal 92; the characteristics of the noise 96 where the receiver is operating; input interference 94; interference received from other operations (in band and aliased signals) of the receiver, including reducing LO leakage power spectral density; choosing a power level that will improve converter 550 performance without introducing excessive artifacts; and the ability to remove the added modulated LO in the digital signal processing stage 560.

Each of these factors is locally measured 532 by the receiver 500 to configure the modulated LO introduced by the LO modulation subsystem 530. Each receiver independently selects the modulated LO; therefore, it is more likely than not that no two receivers will use identical modulated LOs at the same time. Modulation, both type and parameters, can vary as signal or noise conditions change.

LO modulation types that fit these criteria include: linear frequency modulated chirp signals; pseudo noise or Walsh encoded Phase Shift Keying (PSK) signals; clock phase dithered signals) having low power spectral density; OFDM signals with pseudo noise coded content.

As an example, consider a Wi-Fi™ local area wireless technology signal as the expected received signal 90. Two options for building a modulated LO can be used—a similar signal and a dissimilar signal.

Option 1—Similar. Wi-Fi, specifically IEEE 802.11g, uses 54 orthogonal tones spread over 20 MHz bandwidth. An LO modulation of another orthogonal set of tones covering a similar bandwidth is used in the modulation subsystem 530. Each tone is modulated with a pseudo random sequence to minimize periodicity, and uses a simple modulation—Quadrature Phase Shift Keying (QPSK). Not all tones are used in order to isolate the modulated LO in post processing. Specifically, an irregular set of tones is populated (for example, 1, 3, 8, 15, 24, 35, and 48). Each of these tones is modulated (none of the tones are tracking tones). The data rate on each tone is 2× the reciprocal of the tone spacing. The spacing between tones is increased in order to fill the bandwidth and to ensure the tone spacing of the modulated LO and the tone spacing of the received signal are not equal. Alternate signal sets in the similar family can use a different tone sequence and different tone spacing. Each signal set uses a unique pseudo noise sequence. In some embodiments, the tones use the same pseudo random generation structure with a different starting point in the sequence.

Option 2—Dissimilar. Wi-Fi's 20 MHz bandwidth is filled with a QPSK modulated single tone. The data signal is 40+/−1 Mbps pseudo noise data. Alternate signal sets can use a different data rate in the 40+/1 Mbps range. Each signal set uses a unique pseudo noise signal as in Option 1.

Consider, as an additional example, a 1.25 MHz bandwidth Code Division Multiple Access (CDMA) signal such as used in in Evolution-Data Optimized (EVDO) or 1×RTT CDMA2000 systems. In this case, a similar pseudo noise modulated single carrier is used for the local oscillator. The data rate can be offset from the data rate of the intended signal to minimize interaction. For example, a different data rate and a different pseudo noise sequence (same generator structure with a different offset) can be used. Example, data rate offsets range from 10% (125 kbps) to 5% (62.5 kbps).

A dissimilar signal case can also be used for EVDO where an Orthogonal Frequency Division Multiplexing (OFDM) local oscillator modulation is used. For example, a 15-tone stack spread across 1.25 MHz can be used where 5 of the 15 possible tones are chosen and modulated with pseudo noise data. The data rate on each tone can be 2× the reciprocal of the 15 tone spacing. Alternate signal sets in the family use a different set of 5 tones and use a different offset in the pseudo noise data generator.

Example Processes

Figure 6:
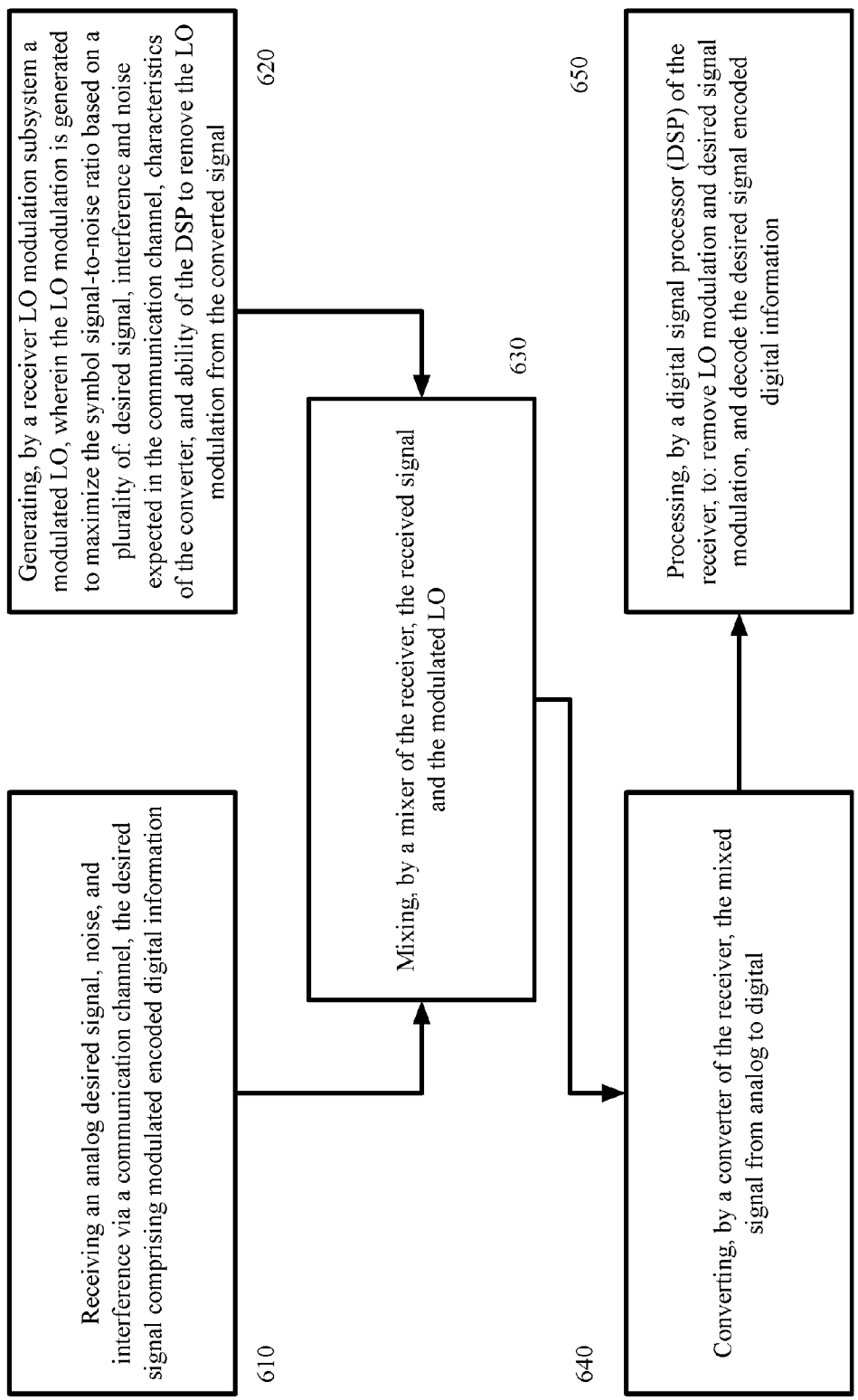
FIG. 6 is a block process diagram depicting example methods for receiving an RF transmission in accordance with certain example embodiments.

Referring to FIG. 6, and continuing to refer to prior figures for context, methods 600 for receiving an RF transmission, in accordance with certain example embodiments, are described.

In such methods 600, an analog desired signal 92, noise 96, and interference 94 are received via a communication channel by an antenna subsystem of a receiver 500—Block 610. The desired signal comprises modulated encoded digital information. In a continuing example, the desired signal comprises an IEEE 802.11g-compliant (Wi-Fi™) signal comprising a set of 54 orthogonal tones over a 20 MHz bandwidth.

A modulated local oscillator (LO) is generated by an LO modulation subsystem 530 of the receiver 500—Block 620. The modulated LO is generated by the LO modulation subsystem 530 to maximize the symbol signal-to-noise ratio of the desired signal based on a plurality of: the desired signal 92 itself, the interference 94 and the noise 96 expected in the communication channel of the received signal 90, the characteristics of an analog-to-digital converter (ADC) 550 of the receiver 500, and the ability of a digital signal processor (DSP) 560 of the receiver 500 to remove the LO modulation from the converted signal. In the continuing example, the LO modulation comprises an irregular set of Quadrature Phase Shift Keying (QPSK) modulated orthogonal tones from the set of 54 orthogonal tones at a data rate of twice the reciprocal of the tone spacing, and equally spaced across the 20 MHz bandwidth modulated using a pseudo random noise sequence.

The received signal and the modulated LO are mixed by a mixer 540 of the receiver 500—Block 630. The mixed signal is converted from analog to digital by a converter 550 of the receiver 500—Block 640.

A DSP 560 of the receiver 500 removes modulated LO and desired signal modulation, and decodes the desired signal encoded digital information—Block 650. In the continuing example, the DSP removes the QPSK modulation of the LO, and then decodes the data of the Wi-Fi signal.

Other Example Embodiments

FIG. 7 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCP"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures. For example, embodiments of the disclosed technology can be implemented in any architecture in which a radio frequency signal is processed (for example, cellular telephone, Wi-Fi networks and other base stations).

What is claimed is:

1. A radio frequency (RF) receiver, comprising:
an antenna subsystem that receives an analog desired signal via a communication channel, the desired signal comprising modulated encoded digital information;
a local oscillator (LO) modulation subsystem that generates a modulated LO;
a mixer that mixes the received signal and the modulated LO;
a converter that converts the mixed signal from analog to digital; and
a digital signal processor (DSP) that: removes LO modulation and desired signal modulation from the converted signal, and decodes the desired signal encoded digital information,
wherein the modulated LO is generated to maximize a symbol signal-to-noise ratio of the desired signal based on a plurality of: the desired signal, interference and noise expected in the communication channel, the characteristics of the converter, and an ability of the DSP to remove the modulated LO from the converted signal.

2. The RF receiver of claim 1, wherein:
the desired signal is an IEEE 802.11-compliant signal comprising a set of 54 orthogonal tones over a 20 MHz bandwidth; and
the LO modulation comprises an irregular set of Quadrature Phase Shift Keying (QPSK) modulated orthogonal tones from the set of 54 orthogonal tones at a data rate of twice the reciprocal of tone spacing and equally spaced across the 20 MHz bandwidth modulated using a pseudo random noise sequence.

3. The RF receiver of claim 1, wherein:
the desired signal is an IEEE 802.11-compliant signal comprising a set of 108 orthogonal tones over a 40 MHz bandwidth; and the LO modulation comprises an irregular set of Quadrature Phase Shift Keying (QPSK) modulated orthogonal tones from the set of 108 orthogonal tones at a data rate of twice the reciprocal of tone spacing and equally spaced across the 20 MHz bandwidth modulated using a pseudo random noise sequence.

4. The RF receiver of claim 1, wherein:
the desired signal is an IEEE 802.11-compliant signal comprising a set of 54 orthogonal tones over a 20 MHz bandwidth; and
the LO modulation comprises a single Quadrature Phase Shift Keying (QPSK) modulated orthogonal tone using a 40 Mbps+/−1 Mbps pseudo random noise sequence.

5. The RF receiver of claim 1, wherein:
the desired signal is a Code Division Multiple Access (CDMA) signal; and
the LO modulation comprises pseudo noise modulated single carrier at a data rate offset from the desired signal in the range −10% to −5% of the bandwidth of the desired signal.

6. The RF receiver of claim 1, wherein:
the desired signal is an Evolution Data Optimized (EVDO) signal; and
the LO modulation comprises an Orthogonal Frequency Division Multiplexing (OFDM) signal comprising 5 tones from a 15 tone stack across the bandwidth of the desired signal modulated with pseudo random noise data at twice the reciprocal of the 15 tone spacing.

7. A method to receive radio frequency (RF) transmissions, comprising:

receiving, by an antenna subsystem of a receiver, an analog desired signal, noise, and interference via a communication channel, the desired signal comprising modulated encoded digital information;
generating, by a local oscillator (LO) modulation subsystem of the receiver, a modulated LO; and
mixing, by a mixer of the receiver, the received signal and the modulated LO;
converting, by a converter of the receiver, the mixed signal from analog to digital; and
processing, by a digital signal processor (DSP) of the receiver, to: remove LO modulation and desired signal modulation, and decode the desired signal encoded digital information,
wherein the modulated LO is generated to maximize a symbol signal-to-noise ratio of the desired signal based on a plurality of: the desired signal, interference and noise expected in the communication channel, the characteristics of the converter, and an ability of the DSP to remove the modulated LO from the converted signal.

8. The method of claim 7, wherein:
the desired signal is an IEEE 802.11-compliant signal comprising a set of 54 orthogonal tones over a 20 MHz bandwidth; and
the LO modulation comprises an irregular set of Quadrature Phase Shift Keying (QPSK) modulated orthogonal tones from the set of 54 orthogonal tones at a data rate of twice the reciprocal of tone spacing, and equally spaced across the 20 MHz bandwidth modulated using a pseudo random noise sequence.

9. The method of claim 7, wherein:
the desired signal is an IEEE 802.11-compliant signal comprising a set of 108 orthogonal tones over a 40 MHz bandwidth; and
the LO modulation comprises an irregular set of Quadrature Phase Shift Keying (QPSK) modulated orthogonal tones from the set of 108 orthogonal tones at a data rate of twice the reciprocal of tone spacing, and equally spaced across the 40 MHz bandwidth modulated using a pseudo random noise sequence.

10. The method of claim 7, wherein:
the desired signal is an IEEE 802.II-compliant signal comprising a set of 54 orthogonal tones over a 20 MHz bandwidth; and
the LO modulation comprises a single Quadrature Phase Shift Keying (QPSK) modulated orthogonal tone using a 40 Mbps+/−1 Mbps pseudo random noise sequence.

11. The method of claim 7, wherein:
the desired signal is a Code Division Multiple Access (CDMA) signal; and
the LO modulation comprises pseudo noise modulated single carrier at a data rate offset from the desired signal in the range −10% to −5% of the bandwidth of the desired signal.

12. The method of claim 7, wherein:
the desired signal is Evolution Data Optimized (EVDO) signal; and
the LO modulation comprises an Orthogonal Frequency Division Multiplexing (OFDM) signal comprising a 5 tones from a 15 tone stack across the bandwidth of the desired signal modulated with pseudo random noise data at twice the reciprocal of the 15 tone spacing.

13. A computer program product, comprising:
a non-transitory computer-readable storage device having computer-executable program instructions embodied thereon that when executed by a computer cause the computer to receive desired signals, the computer-executable program instructions comprising:
computer-executable program instructions to receive an analog desired signal, noise, and interference via a communication channel, the desired signal comprising modulated encoded digital information;
computer-executable program instructions to generate a modulated LO;
computer-executable program instructions to mix the received signal and the modulated LO;
computer-executable program instructions to convert the mixed signal from analog to digital; and
computer-executable program instructions to remove LO modulation and desired signal modulation, and decode the desired signal encoded digital information;
wherein the modulated LO is generated to maximize a symbol signal-to-noise ratio based on a plurality of: the desired signal, the interference and the noise expected in the communication channel, the characteristics of the converter, and an ability of the computer to remove the modulated LO from the converted signal.

14. The computer program product of claim 13, wherein:
the desired signal is an IEEE 802.II-compliant signal comprising a set of 54 orthogonal tones over a 20 MHz bandwidth; and
the LO modulation comprises an irregular set of Quadrature Phase Shift Keying (QPSK) modulated orthogonal tones from the set of 54 orthogonal tones at a data rate of twice the reciprocal of tone spacing, and equally spaced across the 20 MHz bandwidth modulated using a pseudo random noise sequence.

15. The computer program product of claim 13, wherein:
the desired signal is an IEEE 802.1 I-compliant signal comprising a set of 108 orthogonal tones over a 40 MHz bandwidth; and
the LO modulation comprises an irregular set of Quadrature Phase Shift Keying (QPSK) modulated orthogonal tones from the set of 108 orthogonal tones at a data rate of twice the reciprocal of tone spacing, and equally spaced across the 40 MHz bandwidth modulated using a pseudo random noise sequence.

16. The computer program product of claim 13, wherein:
the desired signal is an IEEE 802.II-compliant signal comprising a set of 54 orthogonal tones over a 20 MHz bandwidth; and
the LO modulation comprises a single Quadrature Phase Shift Keying (QPSK) modulated orthogonal tone using a 40 Mbps+/−1 Mbps pseudo random noise sequence.

17. The computer program product of claim 13, wherein:
the desired signal is a Code Division Multiple Access (CDMA) signal; and
the LO modulation comprises pseudo noise modulated single carrier at a data rate offset from the desired signal in the range −10% to −5% of the bandwidth of the desired signal.

18. The computer program product of claim 13, wherein:
the desired signal is Evolution Data Optimized (EVDO) signal; and
the LO modulation comprises an Orthogonal Frequency Division Multiplexing (OFDM) signal comprising a 5 tones from a 15 tone stack across the bandwidth of the desired signal modulated with pseudo random noise data at twice the reciprocal of the 15 tone spacing.

* * * * *